(12) United States Patent
Hong et al.

(10) Patent No.: US 7,714,946 B2
(45) Date of Patent: May 11, 2010

(54) ELECTRICALLY-DRIVEN LIQUID CRYSTAL LENS AND STEREOSCOPIC DISPLAY DEVICE USING THE SAME

(75) Inventors: Hyung Ki Hong, Seoul (KR); Sung Min Jung, Incheon-si (KR)

(73) Assignee: LG Display Co., Ltd., Seoul (KR)

( * ) Notice: Subject to any disclaimer, the term of this patent is extended or adjusted under 35 U.S.C. 154(b) by 117 days.

(21) Appl. No.: 12/216,403

(22) Filed: Jul. 3, 2008

(65) Prior Publication Data

US 2009/0015738 A1    Jan. 15, 2009

(30) Foreign Application Priority Data

Jul. 11, 2007    (KR) ...................... 10-2007-0069839

(51) Int. Cl.
*G02F 1/1335*    (2006.01)
(52) U.S. Cl. ............................................. 349/15; 349/1
(58) Field of Classification Search ..................... 349/1, 349/15
See application file for complete search history.

(56) References Cited

U.S. PATENT DOCUMENTS 6,809,786 B2 *    10/2004    Lee .............................. 349/115
7,486,341 B2 *    2/2009    Hong et al. .................... 349/11

* cited by examiner

*Primary Examiner*—Jennifer Doan
(74) *Attorney, Agent, or Firm*—Morgan, Lewis & Bockius LLP

(57) ABSTRACT

An liquid crystal lens for improving a viewing angle and reducing crosstalk caused at the center of an electrode in a multi-view stereoscopic display fashion using an increased number of views per a viewing zone, and a stereoscopic display device using the same are disclosed. The display device includes a display panel having a plurality of sub-pixels in a matrix pattern to emit a 2-dimensional image signal, and an electrically-driven liquid crystal lens located at an upper surface of the display panel and including lens regions having a crosswise width equal to "m", a multiple of a crosswise width of a single sub-pixel and a lengthwise width equal to "n", a multiple of a lengthwise width of the sub-pixel, the lens regions of one line being shifted more than the lens regions of a following line by a distance "a" when viewed from a column direction.

13 Claims, 8 Drawing Sheets ically-driven liquid crystal lens, which can improve a viewing angle and reduce crosstalk caused at the center of an electrode with relation to a multi-view stereoscopic display fashion using an increased number of views per a viewing zone, and a stereoscopic display device using the same.

ELECTRICALLY-DRIVEN LIQUID CRYSTAL LENS AND STEREOSCOPIC DISPLAY DEVICE USING THE SAME

This application claims the benefit of the Korean Patent Application No. P2007-069839, filed on Jul. 11, 2007, which is hereby incorporated by reference as if fully set forth herein.

BACKGROUND OF THE INVENTION

1. Field of the Invention

The present invention relates to an electrically-driven liquid crystal lens, and more particularly, to an electrically-driven liquid crystal lens, which can improve a viewing angle and reduce crosstalk caused at the center of an electrode with relation to a multi-view stereoscopic display fashion using an increased number of views per a viewing zone, and a stereoscopic display device using the same.

2. Discussion of the Related Art

Nowadays, services for rapid dissemination of information, which will be constructed on the basis of high-speed information communication networks, have been developed from a simple "listening and speaking" service, such as current telephones, to a "watching and listening" multimedia type service on the basis of digital terminals used for high-speed processing of characters, voice and images, and are expected to be ultimately developed to cyberspace real 3-dimensional stereoscopic information communication services enabling virtual reality and stereoscopic viewing.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference of images due to the positional difference of both the eyes is called binocular disparity. Also, a 3-dimensional stereoscopic image display device is designed on the basis of binocular disparity, allowing the left eye to watch only an image for the left eye and the right eye to watch only an image for the right eye.

Specifically, the left and right eyes watch different two-dimensional images, respectively. If the two images are transmitted to the brain through the retina, the brain accurately fuses the images, giving the impression of reproducing a real 3-dimensional image. This ability is conventionally called stereography, and a display device utilizing this ability is called a stereoscopic display device.

Meanwhile, stereoscopic display devices can be classified according to components of a 3-dimensional reproduction lens. For example, a lens constructed using a liquid crystal layer is called a liquid crystal lens, which will be driven by an electric field. Hereinafter, this kind of lens is called an electrically-driven liquid crystal lens.

Conventionally, a liquid crystal display device includes two electrodes opposite each other, and a liquid crystal layer formed between the two electrodes. Liquid crystal molecules of the liquid crystal layer are driven by an electric field generated when a voltage is applied to the two electrodes. The liquid crystal molecules have polarization and optical anisotropy properties. Here, the polarization property is that, when a liquid crystal molecule is placed within an electric field, charges in the liquid crystal molecule are gathered to opposite sides of the liquid crystal molecule, whereby a molecular arrangement direction is converted according to an applied electric field. The optical anisotropy property is that, owing to an elongated configuration of liquid crystal molecules and the above-described molecular arrangement direction, the incidence direction of incident light is changed, or the path of light to be emitted or polarization degree is changed according to polarization conditions.

Accordingly, the liquid crystal layer represents a difference of transmissivity by a voltage applied to the two electrodes, and an image can be displayed using the transmissivity difference of pixels.

Recently, there has been developed an electrically-driven liquid crystal lens in which a liquid crystal layer serves as a lens using the above-described properties of liquid crystal molecules.

Specifically, a lens controls the path of incident light according to a given position using a refractive index difference between a lens constituent material and air. If different voltages are applied to different positions of the liquid crystal layer to drive the liquid crystal layer by different electric fields, the incident light into the liquid crystal layer undergoes different phase variations, and as a result, the light crystal layer can control the path of incident light like an actual lens.

Hereinafter, a conventional electrically-driven liquid crystal lens will be described with reference to the accompanying drawings.

FIG. 1 is a sectional view illustrating a conventional electrically-driven liquid crystal lens, and FIG. 2 is a graph illustrating phase variation of incident light depending on position when light passes through the conventional electrically-driven liquid crystal lens.

As shown in FIGS. 1 and 2, the conventional electrically-driven liquid crystal lens includes first and second substrates 10 and 20 arranged opposite each other, and a liquid crystal layer 30 interposed between the first substrate 10 and the second substrate 20.

Here, first electrodes 11 are formed on the first substrate 10 and are spaced apart from one another by a first interval. In these neighboring first electrodes 11, a distance from the center of one of the first electrodes 11 to the center of the next first electrode 11 is called a pitch. Repeating the same pitch for each of the first electrodes 11 forms a pattern.

A second electrode 21 is formed throughout a surface of the second substrate 20 opposite the first substrate 10.

The first and second electrodes 11 and 21 are made of transparent metal. The liquid crystal layer 30 is formed in a space between the first electrode 11 and the second electrode 21. Liquid crystal molecules, constituting the liquid crystal layer 30, have a property of responding to the strength and distribution of an electric field, and thus, have a phase distribution similar to the electrically-driven liquid crystal lens as shown in FIG. 2.

The above-described electrically-driven liquid crystal lens is formed under the condition of applying a high voltage to each first electrode 11 and grounding the second electrode 21. Under these voltage conditions, the vertical electric field is strongest at the center of the first electrode 11, and the strength of the vertical electric field decreases away from the first electrode 11. Thereby, when the liquid crystal molecules, constituting the liquid crystal layer 30, have a positive dielectric constant anisotropy, the liquid crystal molecules are arranged according to the electric field in such a way that they are upright at the center of the first electrode 11 and tilt closer to the horizontal plane with increasing distance from the first electrode 11. As a result, in view of light transmission, an optical path is shortened at the center of the first electrode 11, and is lengthened with increasing distance from the first electrode 11. Representing the length variation of the optical path using a phase plane, the electrically-driven liquid crystal lens shown in FIG. 2 exhibits light transmission effect similar to a parabolic lens having a paraboloidal surface.

The above-described electrically-driven liquid crystal lens can be accomplished by providing electrodes on both substrates, respectively, with liquid crystals interposed therebetween and applying voltages to the electrodes, eliminating the need for a lens having a physically formed paraboloidal (convex) surface.

However, referring to FIG. 2, it can be appreciated that achieving the same phase plane as a parabolid using the electrically-driven liquid crystal lens when a voltage is applied to realize imaging is difficult, and in particular, the phase plane seriously deviates from the profile of the parabolic lens at a region corresponding to the center of the first electrode, i.e. at a lens edge. Deviation of the phase plane from the parabolic lens means that light transmission at the corresponding region is carried out differently from the parabolic lens. This may result in a distorted image upon realization of a 3-dimensional screen. Here, the center of the first electrode corresponds to the lens edge, and thus, the lens profile distortion occurs at the lens edge (i.e. at the first electrode). This profile distortion causes crosstalk, i.e. unintended signals, and such a signal distortion region is called an edge error region. In this case, the greater the pitch, which is a crosswise width of each lens region, i.e. the greater the lens area, the greater the resulting lens profile distortion at a specific region distant from the first electrode, due to reduced electric field effects of the specific region.

Here, the first electrode has a bar shape extending into the drawing. The liquid crystal lens, formed by the vertical electric field between the first electrode and the second electrode, has a parabolic profile in a crosswise direction as shown in FIG. 2. Also, with respect to a longitudinal direction of the first electrode (i.e. in the direction into the drawing), liquid crystals of the liquid crystal layer exhibit the same phase difference under the influence of the same electric field. Thereby, the liquid crystal lens is formed, facing into the drawing, in a cylinder shape having a single paraboloidal cross section.

In addition, the liquid crystals of the liquid crystal layer have an optical path difference of a paraboloidal profile in a crosswise direction, to provide the same function as a parabolic optical lens. However, the liquid crystals are driven by the same phase difference in a lengthwise direction, thereby having the same lengthwise orientation. Therefore, the conventional electrically-driven liquid crystal lens can provide a user (i.e. an observer) with the optimum stereoscopic display visibility only when the user is not in motion. However, when the user moves left or right, the user views different sections of the liquid crystal lens, resulting in inaccurate image recognition or a distorted image.

The above-described conventional electrically-driven liquid crystal lens has the following problems.

Specifically, upon formation of the electrically-driven liquid crystal lens, edges of lens regions have a seriously deviated phase from the profile of a lens having a physically-realized parabolic or convex surface, causing distortion of refractive index upon realization of a 3-dimensional image. This results in crosstalk at the edges of the lens regions, making it impossible to display a normal image.

Further, the liquid crystals of the liquid crystal layer have an optical path difference of a parabolic profile in a crosswise direction to provide the same function as a parabolic optical lens. However, the liquid crystals are driven by the same phase difference in a lengthwise direction, thereby having the same lengthwise orientation. Therefore, the conventional electrically-driven liquid crystal lens can provide a user (i.e. an observer) with the optimum stereoscopic display visibility only when the user is not in motion. However, when the user moves left or right, the user views different sections of the liquid crystal lens, resulting in inaccurate image recognition or a distorted image.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An object of the present invention is to provide an electrically-driven liquid crystal lens, which can improve a viewing angle and reduce crosstalk caused at the center of an electrode with relation to a multi-view stereoscopic display fashion using an increased number of views per a viewing zone, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic display device comprises: a display panel having a plurality of sub-pixels arranged in a matrix pattern and adapted to emit a 2-dimensional image signal; and an electrically-driven liquid crystal lens located at an upper surface of the display panel and consisting of lens regions each having a crosswise width equal to "m", a multiple of a crosswise width of a single sub-pixel and a lengthwise width equal to "n", a multiple of a lengthwise width of the sub-pixel, the lens regions of one line being shifted more than the lens regions of a following line by a shift distance "a" when viewed in a column direction, wherein the electrically-driven liquid crystal lens comprises: first and second substrates arranged opposite each other; first electrodes formed on the first substrate to correspond to edges of the respective lens regions on the first substrate; second electrodes formed, about the respective first electrodes, on the first substrate underneath the first electrodes and placed between centers of the neighboring left and right lens regions; a black matrix layer formed along boundaries of the lens regions of different lines; a third electrode formed throughout the second substrate; and a liquid crystal layer interposed between the first substrate and the second substrate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Figure 1:
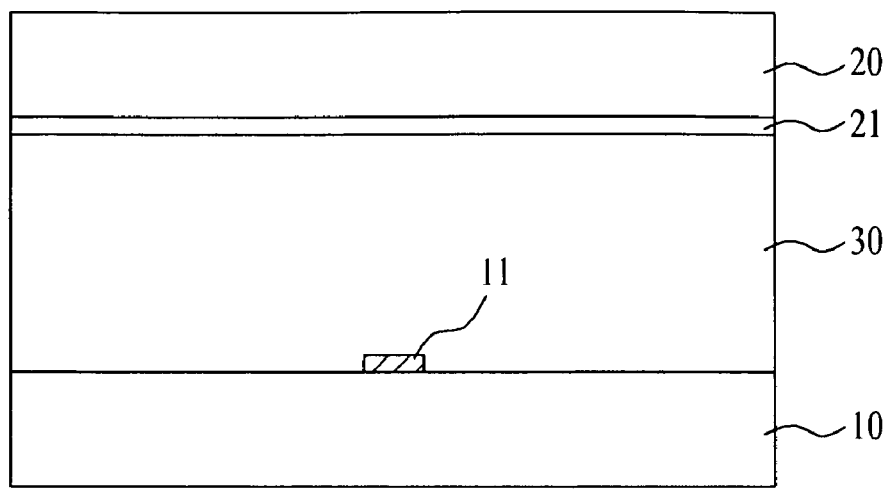
FIG. 1 is a sectional view illustrating a conventional electrically-driven liquid crystal lens.
Figure 2:
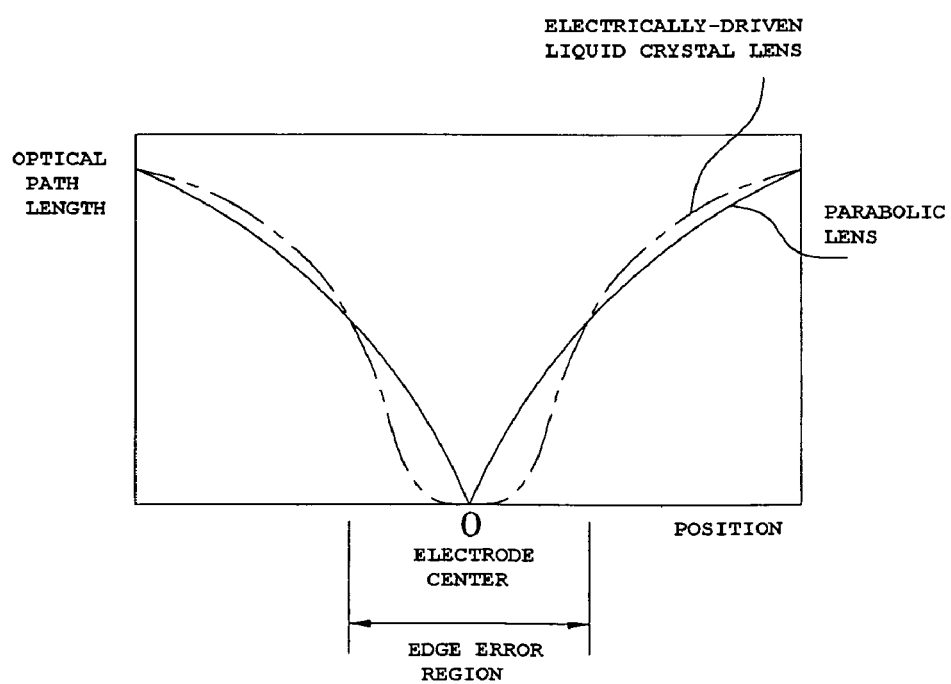
FIG. 2 is a graph illustrating a phase of the conventional electrically-driven liquid crystal lens.
Figure 3:
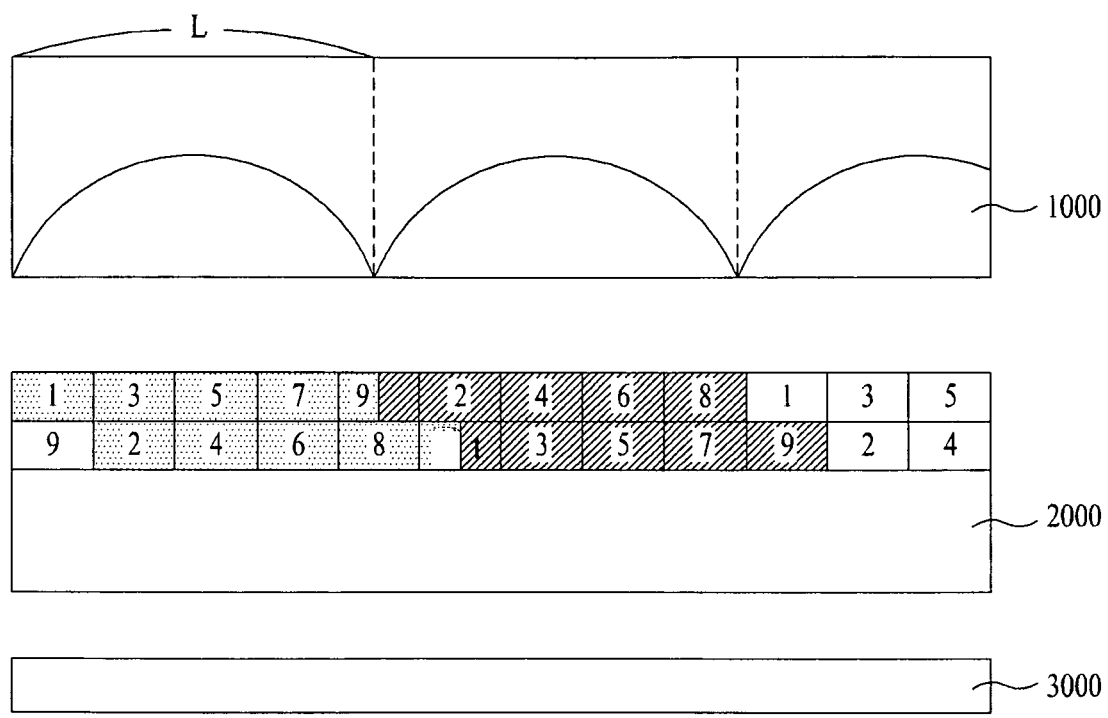
FIG. 3 is a schematic sectional view illustrating a stereoscopic display device including an electrically-driven liquid crystal lens according to the present invention.

FIG. 3 is a schematic sectional view illustrating a stereoscopic display device including an electrically-driven liquid crystal lens according to the present invention.

As shown in FIG. 3, the stereoscopic display device, which adopts an electrically-driven liquid crystal lens according to the present invention, includes an electrically-driven liquid crystal lens 1000, which is driven according to applied voltage and functions a lens, a display panel 2000, which is disposed at the lower side of the electrically-driven liquid crystal lens 1000 and serves to emit 2-dimensional image information, and a light source 3000, which is disposed at the lower side of the display panel 2000 and serves to transmit light to the display panel 2000.

As occasion demands, if the display panel 2000 is a self-illuminating device, the light source 3000 may be omitted.

The display panel 2000 is provided with a plurality of sub-pixels in a matrix pattern, and r, g and b image signals are sequentially applied to the respective sub-pixels, per unit column.

The display panel 2000 can be selected from various flat-panel displays including a liquid crystal display (LCD), organic light emitting display (OLED), plasma display panel (PDP), field emission display (FED), etc.

The electrically-driven liquid crystal lens 1000 functions to selectively emit a 2-dimensional or 3-dimensional image according to applied voltage. In a state wherein no voltage is applied, the electrically-driven liquid crystal lens 1000 functions as a transmission layer, directly emitting a 2-dimensional image applied from the display panel 2000. On the other hand, when a voltage is applied thereto, the electrically-driven liquid crystal lens 1000 acts, based on an optical path difference between different positions of liquid crystals, like a parabolic lens. Here, the parabolic lens has a parabolic profile in a row direction, and the resulting parabolic row section is equally repeated in a column direction of the parabolic lens, whereby the parabolic lens can achieve a cylinder shape having a parabolic phase in the column direction thereof.

Figure 6:
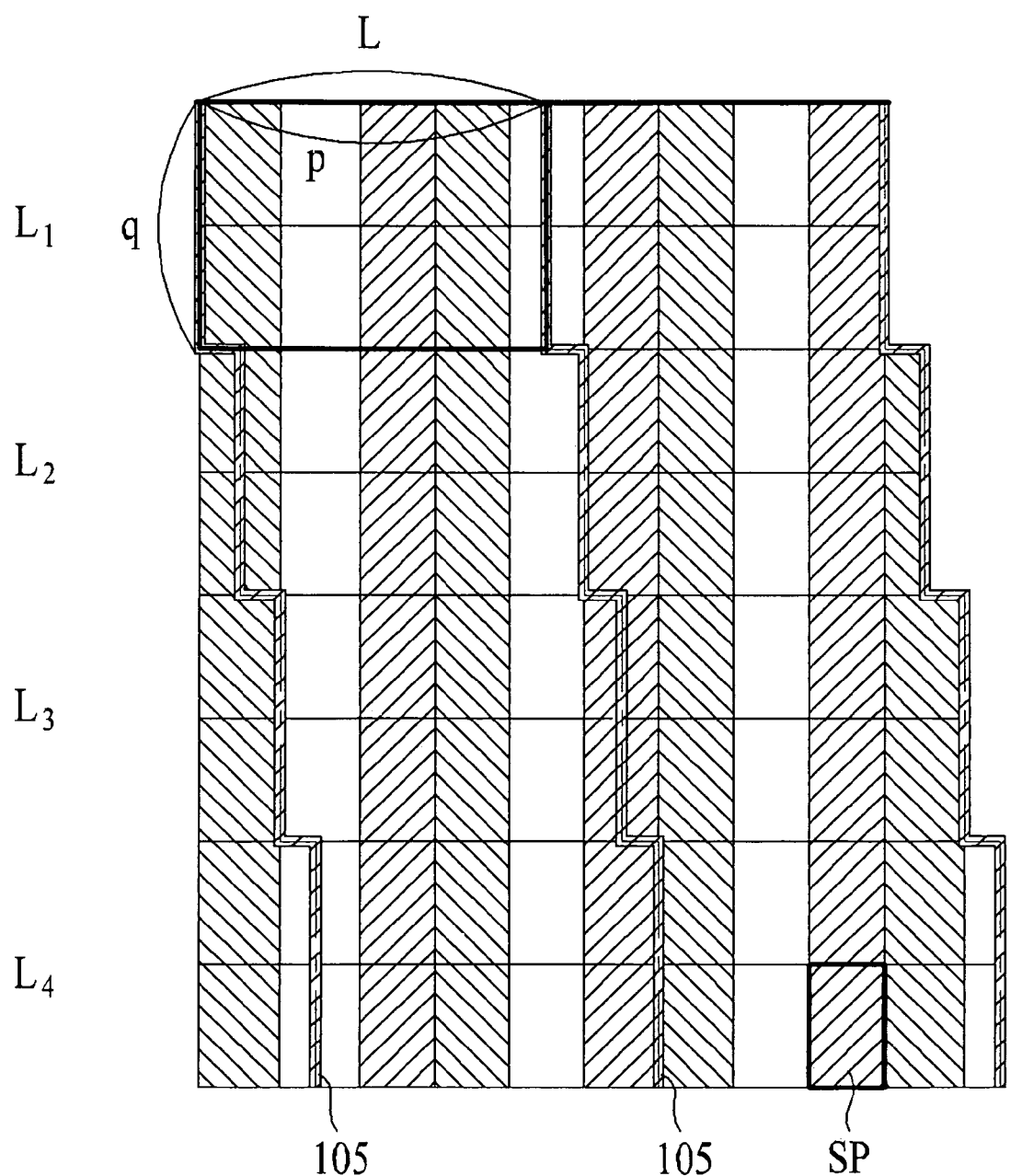
FIG. 6 is a plan view illustrating an upper substrate (i.e. a second substrate) of the electrically-driven liquid crystal lens according to the present invention.

The electrically-driven liquid crystal lens 100 consists of a plurality of unit lens regions L each having a crosswise width p and a lengthwise width q (See FIG. 6). As shown in FIG. 3, an optical lens can be realized as an optical path difference of a parabolic profile occurs in a row direction of each lens region L. Numbers 1 to 9, provided in the display panel 2000 in correspondence to each lens region L, represent the number of views included in a single lens region L, i.e. the number of view points that may occur according to movement of the user (i.e. the observer) The drawing illustrates the case where the total number of views is 9. Here, the total of 9 views corresponds to a sub-pixel arrangement of 4.5 vertical sub-pixels and 2 horizontal sub-pixels.

The number of views is not limited to 9, and may be increased or decreased according to the pitch of lens regions L and the size of sub-pixels of the display panel.

The lens region L represents a region, which does not have the profile of a physically formed lens such as the shown convex lens and has the same optical effect as a lens according to an optical path difference caused when liquid crystals are arranged according to applied electric field.

Hereinafter, the electrically-driven liquid crystal lens 1000 of the present invention, which can realize multiple views and achieve a 2-dimension/3-dimension switching function, will be described in detail with reference to the accompanying drawings.

Figure 4:
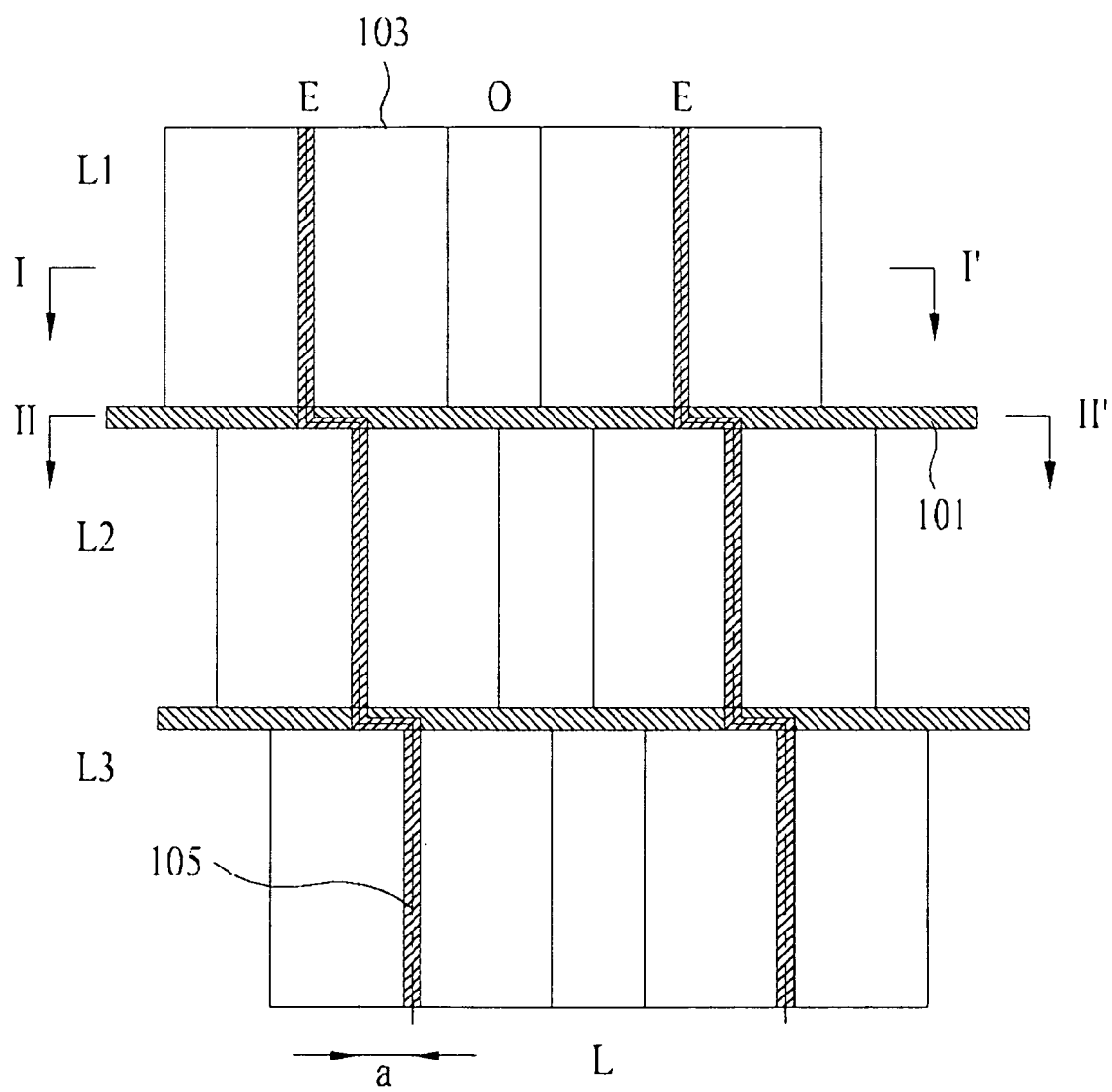
FIG. 4 is a plan view illustrating a lower substrate (i.e. a first substrate) of the electrically-driven liquid crystal lens according to the present invention.
Figure 5:
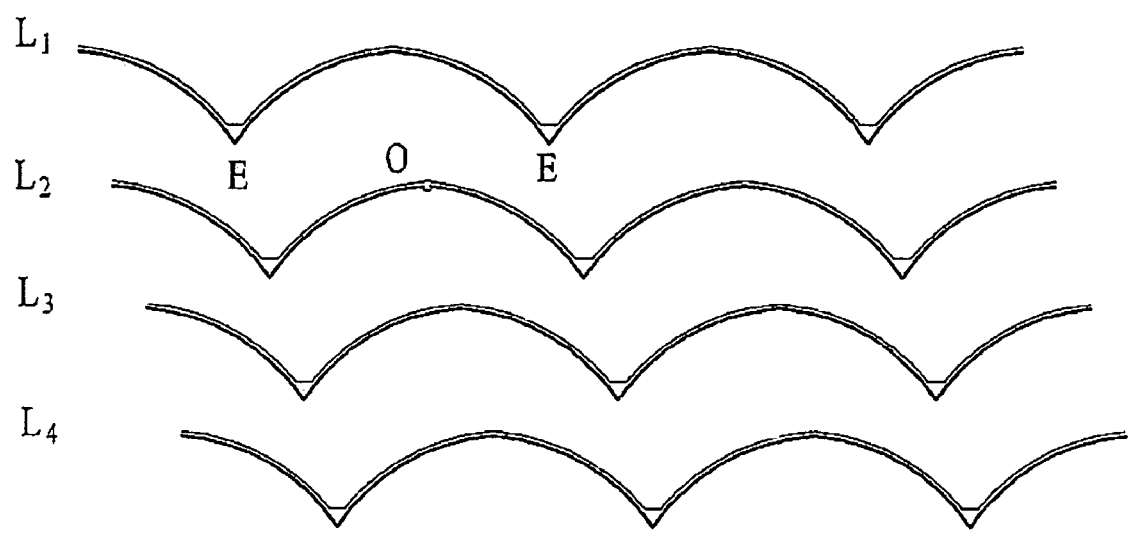
FIG. 5 is a graph illustrating a lens profile realized at respective layers of stepped lens regions shown in FIG. 4.
Figure 7:
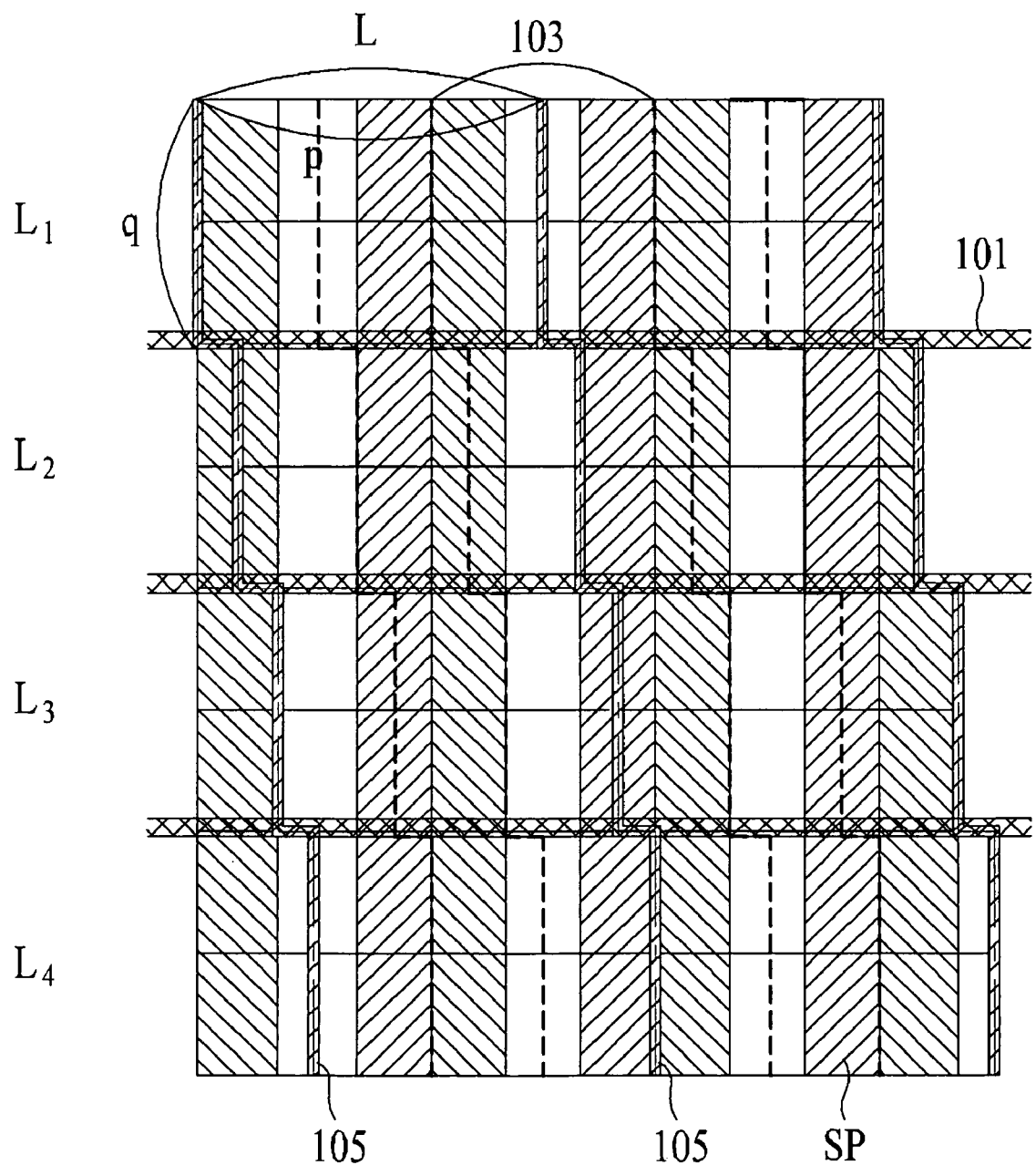
FIG. 7 is a plan view illustrating the bonded upper and lower substrates of the electrically-driven liquid crystal lens according to the present invention.
Figure 8:
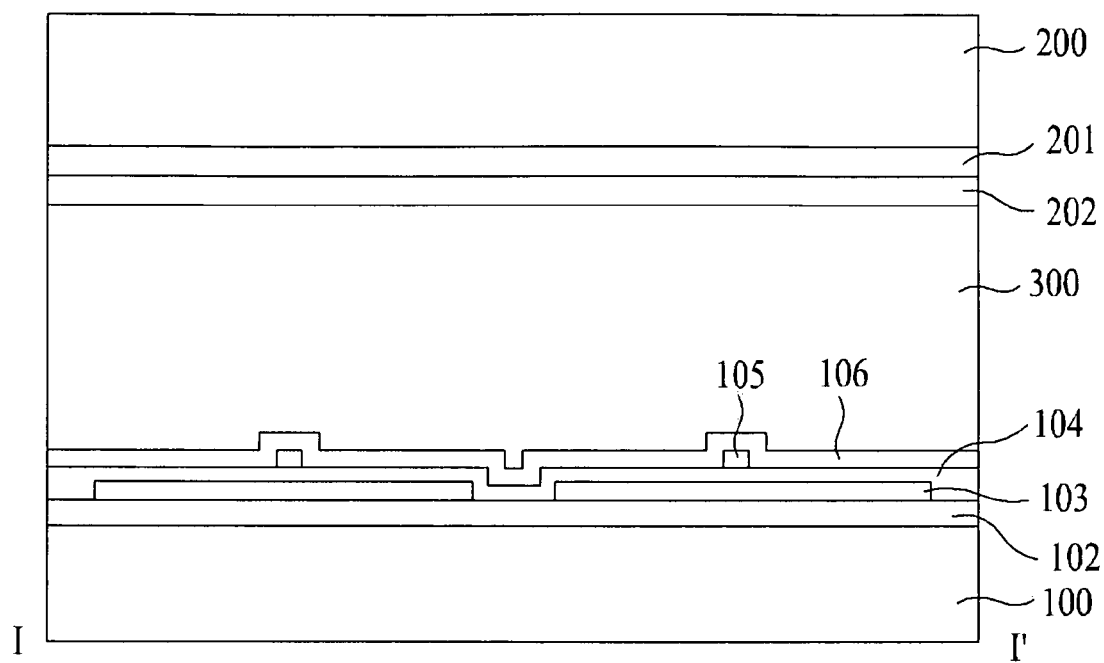
FIG. 8 is a structural sectional view taken along the line I-I' of FIG. 4.
Figure 9:
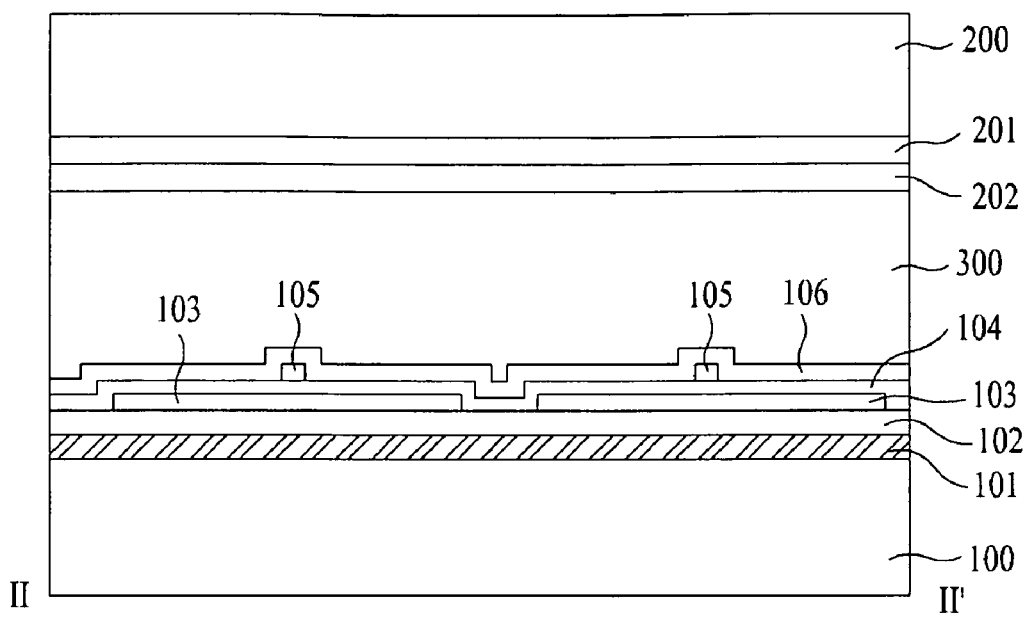
FIG. 9 is a structural sectional view taken along the line II-II' of FIG. 4.

FIG. 4 is a plan view illustrating a lower substrate (i.e. a first substrate) of the electrically-driven liquid crystal lens according to the present invention, and FIG. 5 is a graph illustrating a lens profile realized at respective layers of stepped lens regions shown in FIG. 4. Also, FIG. 6 is a plan view illustrating an upper substrate (i.e. a second substrate) of the electrically-driven liquid crystal lens according to the present invention, and FIG. 7 is a plan view illustrating the bonded upper and lower substrates of the electrically-driven liquid crystal lens according to the present invention. FIG. 8 is a structural sectional view taken along the line I-I' of FIG. 4, and FIG. 9 is a structural sectional view taken along the line II-II' of FIG. 4.

As shown in FIGS. 4 to 9, the electrically-driven liquid crystal lens, included in the stereoscopic display device according to the present invention, is located at an upper surface of the display panel, which includes the plurality of sub-pixels SP arranged in a matrix pattern. Each unit lens region of the electrically-driven liquid crystal lens has a crosswise width equal to "m", a multiple of a crosswise width of a single sub-pixel and a lengthwise width equal to "n", a multiple of a lengthwise width of the sub-pixel. When viewed in a column direction, the lens regions of one line are shifted more than the lens regions of a following line by a distance (a). In this case, the number of views is determined by multiplying "m" by "n".

The unit lens region L has a crosswise width p and a lengthwise width q. An area of the lens region L as a multiple of "p" and "q" is a value calculated by multiplying the number of views, included in the unit lens region L, by an area of the sub-pixel. The respective unit lens regions L correspond to the same number of sub-pixels.

The lens regions L have a stepped shape when viewed in a column direction. The shift distance (a) of the lens regions L with respect to the neighboring two lines is a value calculated by dividing the crosswise width of the lens region by the number of views, and is represented by $$a = \frac{p}{(m \times n)} = \frac{(m \times \text{the crosswise width of the sub-pixel})}{(m \times n)}.$$

Consequently, the shift distance (a) is a value calculated by dividing the crosswise width of the sub-pixel by "n" (where, n is a ratio of the lengthwise width of the lens region to the lengthwise width of the sub pixel). For example, assuming that the lens region has a crosswise width equal to 4.5 times the crosswise width of the sub-pixel and a lengthwise width equal to 2 times the lengthwise width of the sub-pixel, the shift distance (a) is equal to a value calculated by dividing the crosswise width of the sub-pixel by 2. This result can be observed from FIGS. 6 and 7.

Now, the configuration of the electrically-driven liquid crystal lens will be described on the basis of each column. With respect to first and second substrates 100 and 200 opposite each other and respective lens regions L1, L2, L3, L4, . . . on the first substrate 100, the electrically-driven liquid crystal lens further includes first electrodes 105, which are formed on the first substrate 100 at positions corresponding to edges E of the respective lens regions L1, L2, L3, L4, . . . , second electrodes 103, which are formed, about the respective first electrodes 105, on the first substrate 100 at positions at the lower side of the first electrodes 105 and are placed between the centers O of the neighboring left and right lens regions L1, L2, L3, L4, . . . , a black matrix layer 101 which is formed along boundaries of the lens regions L1, L2, L3, L4, . . . of different lines, a third electrode 201 which is formed throughout the second substrate 200, and a liquid crystal layer which fills a gap between the first substrate 100 and the second substrate 200.

Here, the second electrodes 103 may be formed throughout the first substrate 100, or may be formed between the centers O of the neighboring left and right lens regions L1, L2, L3, L4, . . . to have a greater width than a width of the first electrodes 105 as shown. Also, the second electrodes 103 can be shifted from the centers O of the neighboring left and right lens regions L by a small distance. As occasion demands, the second electrodes 103 may be formed throughout the first substrate 100 such that the distance becomes zero. The second electrodes 103 are provided with a greater width than the first electrodes 105 for the following reasons. Conventionally, to operate the liquid crystal layer 300, a high voltage and a threshold voltage are applied to the first electrodes 105 and the second electrodes 103, respectively, and a ground voltage is applied to the third electrode 201 opposite the first and second electrodes 105 and 103. Therefore, since a lower voltage is applied to the second electrodes 103 than the first electrode 105, in order to allow the second electrodes 103 to generate a smooth electric field in cooperation with the third electrode 201 and also, to have an effect on the adjustment of a sag of the electrically-driven liquid crystal lens defined in the liquid crystal layer 300 in conjunction with the first electrodes 105, the second electrodes 103 must be wider than the first electrodes 105.

The black matrix layer 101 is formed on the first substrate 100, and the second electrodes 103 and the first electrodes 105 are sequentially formed at the upper surface of the black matrix layer 101 by interposing a first insulating layer 102 and a second insulating layer 104, respectively.

The black matrix layer 101 is made of any one of black resin, chromium (Cr), molybdenum (Mo) and aluminum-neodymium (AlNd). When the black matrix layer 101 is made of black resin, the first insulating layer 102 as shown in FIGS. 8 and 9 can be omitted.

Also, when the display panel is a liquid crystal display panel, an additional black matrix layer is formed at boundaries of the sub-pixels. The black matrix layer 101 formed at the boundaries of the lens regions L must have a larger width than a width of the black matrix layer between the sub-pixels. For example, if a width of the black matrix layer between the sub-pixels is in a range of 20 μm to 30 μm, the black matrix layer 101 of the electrically-driven liquid crystal lens must have a width of 40 μm to 60 μm.

As occasion demands, even if the black matrix layer between the sub-pixels and the black matrix layer 101 of the electrically-driven liquid crystal lens overlap each other, due to the fact that the electrically-driven liquid crystal lens and the display panel are spaced apart from each other by a few millimeters, the boundaries of the lens regions of the electrically-driven liquid crystal lens are often not covered by the black matrix layer between the sub-pixels when viewed from the upper or lower side rather than the front side or when viewed in a left or right direction by a desired angle. In this case, as a result of providing the black matrix layer 101 within the electrically-driven liquid crystal lens, the black matrix layer 101 can serve to cover a distorted lens region observed from the above mentioned directions except for the front side.

The black matrix layer 101 is located at the boundaries of the lens regions L1, L2, L3, L4, . . . , and thus, can cover the lens profile distortion caused at the boundaries of the lens regions L1, L2, L3, L4, . . . , resulting in an improvement in user (observer) visibility. Here, achieving a uniform spatial phase difference value at the boundaries of the lens regions L1, L2, L3, L4, . . . is difficult because a phase difference of the liquid crystal layer rapidly varies therein. Therefore, it is preferred to cover the boundaries of the lens regions L1, L2, L3, L4, . . . . Also, even in view of an electric field, in the boundaries of the lens regions L1, L2, L3, L4, . . . , the first and second electrodes 105 and 103 are formed in a crosswise direction rather than a longitudinal direction (i.e. a lengthwise direction), thereby inducing a vertical electric field. Accordingly, there is a risk in that the liquid crystal layer may be rotated vertically at the boundaries of the lens regions L1, L2, L3, L4, . . . , resulting in deterioration of lens properties obtained by alignment of liquid crystals. The electrically-driven liquid crystal lens of the present invention covers the boundaries of the regions L1, L2, L3, L4, . . . where the electric field distortion occurs, thereby preventing transmission of light through the boundaries, and consequently, improving the overall lens effect of the electrically-driven liquid crystal lens.

Meanwhile, the electrically-driven liquid crystal lens of the present invention directly transmits a 2-dimensional image signal emitted from the display panel 2000 located at the lower side of the lens in an off state wherein no voltage is applied to the respective electrodes. This can be accomplished by adjusting the initial condition of the liquid crystal layer 300. Specifically, this can be accomplished by providing the first and second substrates 100 and 200 with first and second alignment layers 106 and 202, respectively, which are used to control the initial condition of the liquid crystal layer 300.

More specifically, the first alignment layer 106 can be formed throughout the second insulating layer 104 including the first electrodes 105, and the second alignment layer 202 can be further formed on the third electrode 201. In this case, the first alignment layer 106 is subjected to rubbing in a longitudinal direction of the first electrodes 105, and the second alignment layer 202 is subjected to rubbing in a direction intersecting the direction in which the first alignment layer 106 is rubbed.

The second and third electrodes 103 and 201 are made of transparent metal such as Indium Tin Oxide (ITO), Indium Zinc Oxide (IZO), or the like. The first electrodes 105 are preferably made of light-tight opaque metal such as chromium, molybdenum, or the like, to cover the edge of the electrically-driven liquid crystal lens for preventing the effect of crosstalk at the edges.

Meanwhile, upon driving of the liquid crystal layer 300, a high voltage is applied to the first electrodes 105, a threshold voltage is applied to the second electrodes 103, and a ground voltage is applied to the third electrode 201. Thereby, a vertical electric field is generated between the first substrate 100 and the second substrate 200, causing an optical path difference between different sections of the liquid crystal layer 300. In this case, the threshold voltage applied to the second electrodes 103 is an AC square wave voltage having a peak value represented by $$V = \pi \sqrt{\frac{K1}{\Delta \varepsilon \varepsilon 0}}$$

(where, $\Delta \varepsilon$ is a liquid crystal dielectric constant anisotropy, K1 is the modulus of elasticity of the liquid crystal layer, and $\varepsilon_o$ is a free-space dielectric constant) The peak value is in a range of 1.6V to 2.0V. Also, the high voltage applied to the first electrodes 105 is an AC square wave voltage having a peak value of 2.6V to 10V.

Figure 10:
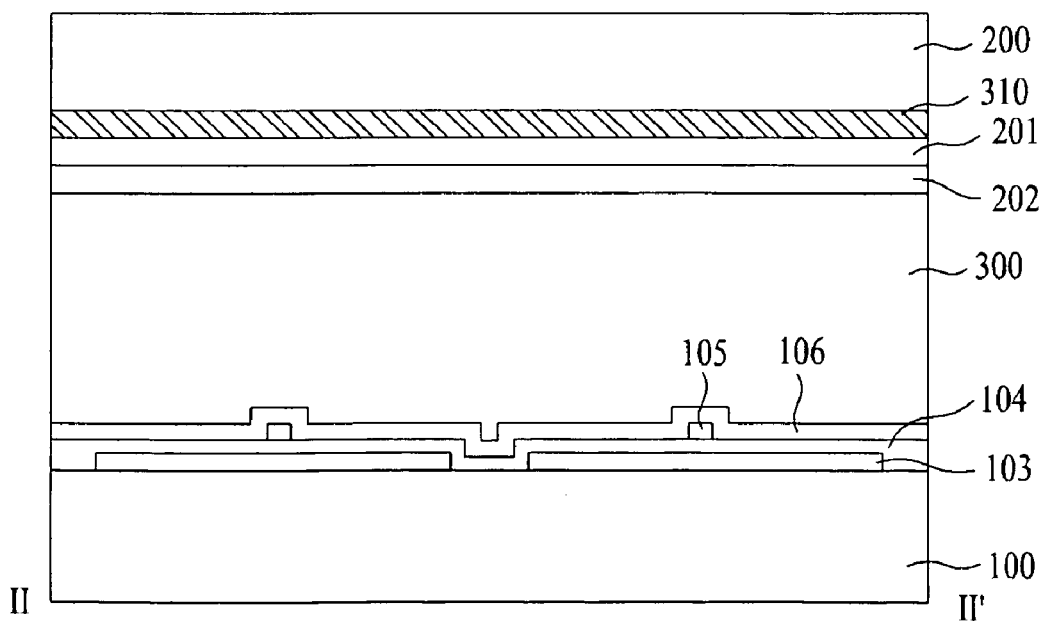
FIG. 10 is a structural sectional view taken along the line II-II' of FIG. 4 according to another embodiment of the present invention.

FIG. 10 is a structural sectional view taken along the line II-II' of FIG. 4 according to another embodiment of the present invention.

Referring to FIG. 10 illustrating an electrically-driven liquid crystal lens according to another embodiment of the present invention, a black matrix layer 310 is formed on the second substrate 200. The electrically-driven liquid crystal lens of the present embodiment has the same configuration as the above-described electrically-driven liquid crystal lens shown in FIGS. 4 to 9 except for the position of the black matrix layer 310, and thus, a detailed description thereof will be omitted hereinafter.

The black matrix layer 310 is formed in a column direction to correspond to the boundaries of the lens regions in columns, and is not greatly influenced by formation on the first substrate 100 or formation on the second substrate 200. As occasion demands, peripheral keys (not shown) are formed along an outer rim of the first substrate 100 for alignment of layers to be patterned, respectively. Here, if the black matrix layer 310 is formed simultaneously with the formation of the peripheral keys, it is unnecessary to prepare a separate mask. This provides an advantage of reducing the number of processes.

Meanwhile, although not shown, outer rim regions of the first and second substrates 100 and 200 are provided with seal patterns (not shown), to support both the first and second substrates 100 and 200. The liquid crystal layer 300 between the first substrate 100 and the second substrate 200 must have a sufficient thickness equal to approximately 15 µm to 30 µm for formation of the electrically-driven liquid crystal lens having a sufficient phase. To stably maintain the thickness of the liquid crystal layer 300, ball spacers or column spacers can be further formed to support a cell gap between the first substrate 100 and the second substrate 200. In this case, it is advantageous to position the spacers so as not to distort the phase of the electrically-driven liquid crystal lens.

Although the drawings illustrate the case wherein liquid crystal molecules constituting the liquid crystal layer 300 have a positive dielectric constant anisotropy, even when a shifted electrically-driven liquid crystal lens differently from the shown electrically-driven liquid crystal lens is intended, or even when an electrically-driven liquid crystal lens having the same effect as the shown electrically-driven liquid crystal lens is formed, a material having a negative dielectric constant anisotropy can be used by changing the arrangement of the electrodes disposed on the first substrate 100 or by inverting positions of the first and second substrates 100 and 200.

The electrically-driven liquid crystal lens according to the present invention can serve as a lens used for 3-dimensional imaging, and as occasion demands, can be located at the upper surface of a display device having the function of 2-dimensional imaging, thereby serving to convert a 2-dimensional image into a 3-dimensional image for display of the 3-dimensional image. Also, on the basis of the property of transmitting light when no voltage is applied, the electrically-driven liquid crystal lens can achieve a switching function to display a 2-dimensional image when no voltage is applied and to display a 3-dimensional image according to applied voltage. This electrically-driven liquid crystal lens can be used together with a 2-dimensional image display device located at the lower side of the lens. Specifically, by virtue of the switching function between 2-dimensional/3-dimensional imaging, the electrically-driven liquid crystal lens can display a stereoscopic (3-dimensional) image using a 2-dimensional image signal emitted from the display device located at the lower side of the lens according to applied voltage, and also, can display a 2-dimensional image by directly transmitting the 2-dimensional image emitted from the display device when no voltage is applied.

In particular, in the electrically-driven liquid crystal lens of the present invention, the edge of the lens exhibiting serious distortion is covered by use of the light-tight opaque metal, and also, the boundaries of the stepped lens regions of different lines are covered by use of the black matrix layer. As a result, the electrically-driven liquid crystal lens has the effect of covering special regions having a risk of crosstalk and rapid phase difference variation, thereby improving user visibility.

The stereoscopic display device including the electrically-driven liquid crystal lens according to the present invention has the following effects.

The electrically-driven liquid crystal lens of the present invention can minimize the generation of crosstalk by covering an edge error region exhibiting serious distortion by use of a light-tight opaque metal, and also, can prevent rapid phase difference variation at a vertical electric field generating region by providing boundaries of stepped lens regions of different lines with a black matrix layer. As a result, the electrically-driven liquid crystal lens has the effect of improving user visibility.

Further, with the provision of the stepped lens regions rather than simple linear lens regions, in the case of realizing a multi-view display fashion between the lens regions, it is possible to prevent loss of resolution from occurring only in a horizontal direction, and moreover, to achieve uniform resolution in vertical and horizontal directions, and consequently, a reduced resolution loss in a desired specific direction. This results in an improvement in user visibility.

Besides, differently from a conventional large-scale liquid-crystal display device in which a polarizer generally has an optical axis direction of zero degrees or 90 degrees, the electrically-driven liquid crystal lens of the present invention functions to control an optical path of a linearly polarized light component, and therefore, is advantageous to coincide the arrangement and rotation of liquid crystals with an optical axis direction of a polarizer provided in a liquid crystal display panel. With the provision of the stepped lens regions of the present invention, the arrangement of lens regions can coincide with the optical axis direction of the polarizer, whereby an improvement in image quality can be accomplished as compared to a conventional slanted configuration wherein lens regions are tilted relative to a polarizer resulting in asymmetric arrangement of liquid crystals according to applied voltage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A stereoscopic display device comprising: a display panel having a plurality of sub-pixels arranged in a matrix pattern and adapted to emit a 2-dimensional image signal; and an electrically-driven liquid crystal lens located at an upper surface of the display panel and consisting of lens regions each having a crosswise width equal to "m", a multiple of a crosswise width of a single sub-pixel and a lengthwise width equal to "n", a multiple of a lengthwise width of the sub-pixel, the lens regions of one line being shifted more than the lens regions of a following line when viewed in a column direction by a shift distance "a", wherein the electrically-driven liquid crystal lens comprises:
first and second substrates arranged opposite each other;
first electrodes formed on the first substrate to correspond to edges of the respective lens regions on the first substrate;
second electrodes formed, about the respective first electrodes, on the first substrate underneath the first electrodes and placed between centers of the neighboring left and right lens regions;
a black matrix layer formed along boundaries of the lens regions of different lines in a column direction;
a third electrode formed throughout the second substrate; and
a liquid crystal layer interposed between the first substrate and the second substrate.

2. The stereoscopic display device according to claim 1, wherein the shift distance "a" is equal to a value calculated by dividing the crosswise width of the sub-pixel by "n".

3. The stereoscopic display device according to claim 1, wherein the second electrodes are formed throughout the first substrate, or are formed between the centers of the neighboring left and right lens regions.

4. The stereoscopic display device according to claim 1, wherein the black matrix layer is formed on the second substrate.

5. The stereoscopic display device according to claim 1, wherein the black matrix layer is formed on the first substrate, and
the first and second electrodes are sequentially formed at an upper surface of the black matrix layer.

6. The stereoscopic display device according to claim 3, wherein a first alignment layer is formed throughout the first substrate including the first electrodes, and a second alignment layer is formed on the third electrode.

7. The stereoscopic display device according to claim 6, wherein the first alignment layer is subjected to rubbing in a longitudinal direction of the first electrodes, and the second alignment layer is subjected to rubbing in a direction intersecting the direction in which the first alignment layer is rubbed.

8. The stereoscopic display device according to claim 1, wherein the second and third electrodes are made of transparent metal.

9. The stereoscopic display device according to claim 7, wherein the first electrodes are made of light-tight opaque metal.

10. The stereoscopic display device according to claim 1, wherein the black matrix layer is made of any one of black resin, chromium (Cr), molybdenum (Mo) and aluminum-neodymium (AlNd).

11. The stereoscopic display device according to claim 1, wherein, upon driving of the liquid crystal layer, a voltage of 2.6 to 10V is applied to the first electrodes, a voltage of 1.6 to 2.0V is applied to the second electrodes, and the third electrode is grounded.

12. The stereoscopic display device according to claim 1, wherein the respective lens regions correspond to the same number of sub pixels.

13. The stereoscopic display device according to claim 1, wherein the lens regions have a stepped arrangement when viewed in the column direction.

* * * * *